US00RE45355E

(19) United States
(12) Reissued Patent
Root et al.

(10) Patent Number: US RE45,355 E
(45) Date of Reissued Patent: Feb. 3, 2015

(54) DOOR HANGER

(71) Applicants: Nathan K. Root, Wyoming, MI (US); Dennis Gill, Wyoming, MI (US); Michael Gill, Grand Rapids, MI (US)

(72) Inventors: Nathan K. Root, Wyoming, MI (US); Dennis Gill, Wyoming, MI (US); Michael Gill, Grand Rapids, MI (US)

(21) Appl. No.: 13/680,700

(22) Filed: Nov. 19, 2012

Related U.S. Patent Documents

Reissue of:

(64) Patent No.: 7,882,662
Issued: Feb. 8, 2011
Appl. No.: 12/075,750
Filed: Mar. 13, 2008

U.S. Applications:

(60) Provisional application No. 60/894,560, filed on Mar. 13, 2007.

(51) Int. Cl.
*E06B 1/60* (2006.01)
*E04B 1/38* (2006.01)

(52) U.S. Cl.
USPC ..... 52/126.5; 52/213; 52/712; 52/127.1; 49/380

(58) Field of Classification Search
CPC ..... E06B 1/60; E06B 1/6015
USPC ..... 52/105, 126.3, 136.5, 127.1, 204.55, 52/213, 712, 713, 745.16, 715; 49/380, 49/505, 506; 206/325; 248/300, 544, 547, 248/909, 208, 248
See application file for complete search history.

(56) References Cited

U.S. PATENT DOCUMENTS

| | | | | | |
|---|---|---|---|---|---|
| 1,225,525 | A | * | 5/1917 | Sweet | 220/3.92 |
| 1,599,985 | A | * | 9/1926 | Carlson | 403/281 |
| 2,724,960 | A | * | 11/1955 | Nelsson | 52/712 |
| 2,924,090 | A | * | 2/1960 | Schneller | 52/712 |
| 3,205,982 | A | * | 9/1965 | Chimienti | 206/325 |
| 3,226,781 | A | * | 1/1966 | Schnabel | 52/98 |
| 4,012,868 | A | * | 3/1977 | Andruszkiewicz | 49/380 |
| 4,014,146 | A | * | 3/1977 | DiMascio et al. | 52/211 |
| 4,148,454 | A | * | 4/1979 | Carlson et al. | 248/222.11 |
| 4,624,089 | A | * | 11/1986 | Dunker | 52/410 |
| 4,718,195 | A | * | 1/1988 | Ortega | 49/380 |
| 4,840,002 | A | * | 6/1989 | Lovgren | 52/213 |
| 4,986,044 | A | * | 1/1991 | Funari | 52/213 |

(Continued)

*Primary Examiner* — Robert Canfield
(74) *Attorney, Agent, or Firm* — Mitchell Intellectual Property Law, PLLC

(57) ABSTRACT

A door hanger (140) is disclosed for use in installation of a door assembly (100). The door hanger (140) includes a jamb arm (142) with a triangular shaped edge (144), and proximate shorter edges (145) formed inwardly from the triangular shaped edge (144) and perpendicular to each other. A pair of opposing faces (143) are formed by the triangular shaped edge (144) and the proximate edges (145), and a central hole (146) is located substantially in the center of the opposing faces (143). An alignment flange (150) is perpendicular to the jamb arm (142) and includes a distal arcuate edge (152). The arcuate edge (152) has a configuration substantially conforming to the legs of a triangle. Formed inwardly from the distal arcuate edge (152) are a pair of opposing sides (154), with sets of alignment notches (156) formed on the opposing sides (154). The alignment flange (150) also includes an alignment slot (158) for purposes of selectively aligning a connecting screw or the like for attaching the door hanger (140) to either a strike side wall (106) or a hinge side wall (108). The door hanger (140) also includes a pair of tabs (160) which assist in proper alignment of the door hanger (140) along the edges of the strike jamb (128) or hinge jamb (130), as the case may be.

21 Claims, 6 Drawing Sheets

(56) References Cited

U.S. PATENT DOCUMENTS

| | | | | | |
|---|---|---|---|---|---|
| 4,993,670 | A * | 2/1991 | Tesar | 248/68.1 |
| 5,119,609 | A | 6/1992 | Tait et al. | |
| 5,131,616 | A * | 7/1992 | Biba | 248/265 |
| 5,341,619 | A * | 8/1994 | Dunagan et al. | 52/702 |
| 5,575,223 | A * | 11/1996 | Hendel | 108/193 |
| 5,598,680 | A * | 2/1997 | Wilhelmi | 52/715 |
| 5,678,379 | A * | 10/1997 | Quattrociocchi | 52/712 |
| 5,692,350 | A | 12/1997 | Murphy, Jr. | |
| 5,771,644 | A | 6/1998 | Kidd | |
| 5,897,086 | A * | 4/1999 | Condon | 248/220.1 |
| 6,065,724 | A * | 5/2000 | Arslan et al. | 248/248 |
| 6,178,717 | B1 | 1/2001 | Loop | |
| 6,213,679 | B1 * | 4/2001 | Frobosilo et al. | 403/403 |
| 6,286,274 | B1 | 9/2001 | McKann | |
| 6,293,061 | B1 * | 9/2001 | Horak, Jr. | 52/213 |
| 6,357,200 | B1 * | 3/2002 | Vanderpan | 52/745.16 |
| 6,494,015 | B1 * | 12/2002 | Critchlow | 52/749.1 |
| 6,895,718 | B2 * | 5/2005 | Moffatt | 52/204.55 |
| 7,581,352 | B2 * | 9/2009 | Klingbyle | 49/380 |
| 7,716,886 | B2 * | 5/2010 | Gordon | 52/213 |
| D667,289 | S * | 9/2012 | Preda | D8/354 |
| 8,333,359 | B2 * | 12/2012 | Gordon | 248/547 |
| 2004/0060241 | A1 | 4/2004 | Staples et al. | |
| 2004/0094681 | A1 * | 5/2004 | Birnbaum | 248/300 |
| 2005/0262797 | A1 * | 12/2005 | Davis | 52/712 |
| 2008/0054137 | A1 * | 3/2008 | Poulin | 248/208 |
| 2009/0077910 | A1 * | 3/2009 | Gordon | 52/213 |

* cited by examiner

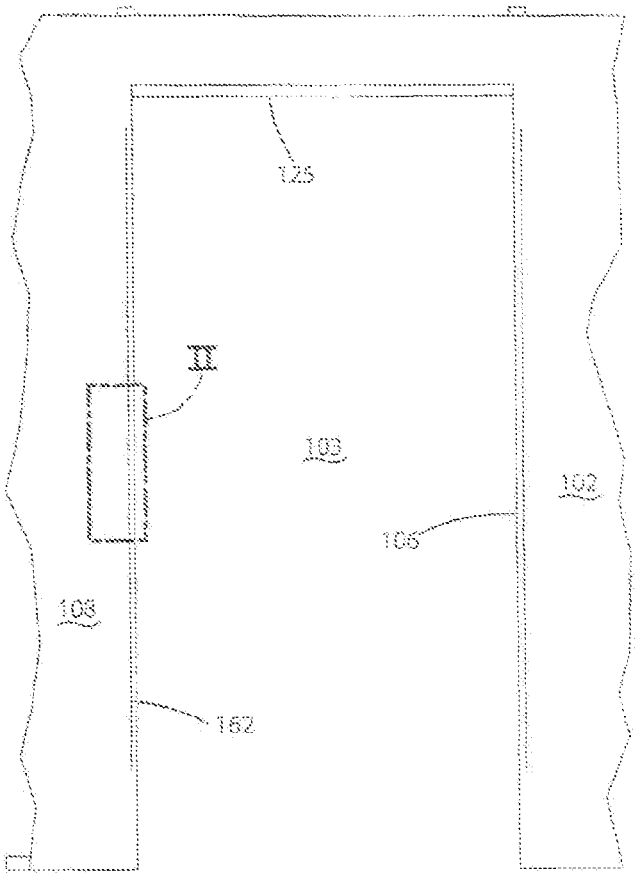
Fig. 1
Amended
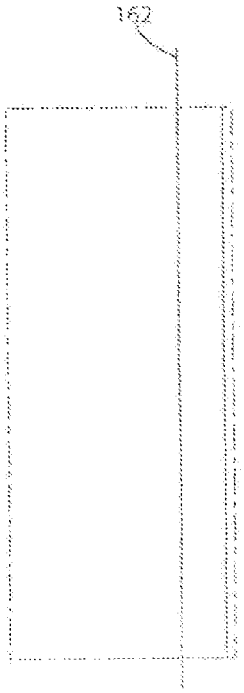
Fig. 2
Amended

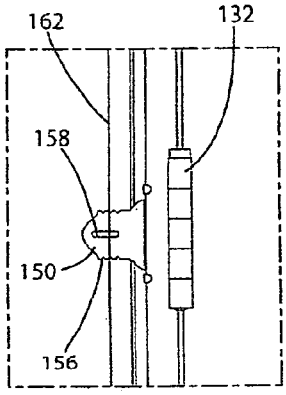
Fig. 8
Amended

DOOR HANGER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority of U.S. Provisional Patent Application Ser. No. 60/894,560 filed Mar. 13, 2007.

STATEMENT REGARDING FEDERALLY SPONSORED RESEARCH OR DEVELOPMENT

Not applicable.

REFERENCE TO A MICROFISHE APPENDIX

Not applicable.

DESCRIPTION OF THE PREFERRED EMBODIMENT

1. Field of the Invention

The invention relates to products and methods for facilitating accurate installation of interior doors and, more specifically, door hangers comprising individual components and methods for use thereof in plumbing and hanging an interior door.

2. Background Art

Historically, many types of door assemblies are utilized in various environments, including, for example, residential, commercial and office interiors. Although numerous types of doors are well known in the art, a typical door assembly may include a door frame or jamb, as well as the door itself. The door frame can include what is characterized as a header jamb assembly for the top of the doorway opening within a wall or the like. Latch and hinge jamb sections are also utilized, for the sides of the doorway opening in the wall. With these types of configurations, it is necessary to be able to accommodate for variations in the thickness and alignment of the wall within which the door is to be located. Accordingly, it is necessary for the door frame to be adjustably positioned so as to accommodate these wall thicknesses.

More specifically, it is not uncommon for door assemblies today to be packaged as a combination of a "pre-hung" door which is hinged to a prefabricated jamb, where the door and the jamb are sold as a single unit. As earlier described, the door jamb is installed within what is often a "rough" opening, framed with studs edged by liners. In the prior art, it is known to install the door assembly by placing the door jamb in the rough opening, and then plumbing the door jamb.

Installation of the door assembly, with the accurate plumbing required, can take a substantial amount of time and be relatively complex. For example, it is not uncommon for a typical installation of a door to require the door to be taken off of the jamb during installation. In addition, various types of installation products and procedures for door assemblies often require the use of shims and the driving of a substantial nails or similar connecting elements.

The following paragraphs describe some of the prior art products and methods utilized to facilitate installation of door assemblies.

Horak, Jr., U.S. Pat. No. 6,293,061 issued Sep. 25, 2001 describes a system and method for installing a jamb within a wall having an inward face facing inwardly toward the door, and a peripheral face facing away from the door. A spaced apart series of clips are utilized, with each clip having an external arm and a transverse internal arm. The external arm is adapted for longitudinally directed and surficial attachment to the wall. The internal arm of each clip is separately attached along the peripheral face of the jamb. With the jamb positioned in the wall, the jamb is plumbed and the external arms of the clips are attached to the wall longitudinally. Plumb means are utilized for determining whether the jamb is plumb, with the plumb means having indicia on the external arm of the clip for alignment with a leveling tool. A deformation is included on the external arm, against which the leveling tool can be aligned.

Tait, et. al., U.S. Pat. No. 5,119,609 issued Jun. 9, 1992 describes the use of a plastic nailing fin for use with a window or door assembly. The nailing fin can be folded from a stored position in front, to a working position along the side. The fin runs the full length and width of a window frame or door frame. Installation requires use of a substantial number of nails.

Murphy, Jr., U.S. Pat. No. 5,692,350 issued Dec. 2, 1997 is an example of an apparatus and method for door leveling utilizing shims. Specifically, the Murphy, Jr. apparatus includes a spring shim and an anchor. The spring shim has a pressure foot at each of two ends for engaging either the wall or the closure, and an intermediate portion having a central aperture for receiving the anchor. The door closure is leveled and plumbed within the opening, by attaching a series of spring shims at spaced locations around the closure. The closure and attached spring shims are then positioned in the opening, followed by the engaging and penetrating of the anchors into the wall.

Kidd, U.S. Pat. No. 5,771,644 issued Jun. 30, 1998 discloses an anchoring clip for the installation of a door in stud or masonry walls. The clip is actually directed toward anchoring of the door, rather than accurate plumbing of the door assembly.

Schnabel, U.S. Pat. No. 3,226,781 issued Jan. 4, 1966 discloses a frame-setting clip having a removable L-shaped clip portion and a permanent L-shaped clip portion. The clip portions have end-to-end connected legs and unconnected spaced apart parallel legs. The parallel legs extend perpendicularly from the connected legs. The parallel clipped portions are located in a common plane and have the same angular orientation, with the connected legs being integrally connected to each other at least approximately in the region where one of the unconnected legs extends perpendicularly from the interconnected legs.

In use, each clip is positioned on the frame so that one of the members of the frame is received and snugly held or clipped between the parallel legs. The longer parallel leg of the permanent clip portion extends into a gap so as to support its respective side of the member, while the parallel leg is situated exposed at the inside of the frame. In this position of the clip, one of the legs of the permanent clip portion overlaps and is located to rest against or next to a wall member of the opening. The clips can thus be mounted on the members, and adjusted lengthwise along their respective members so as to space them evenly from each other. Each clip is then nailed to that portion of the wall of the opening against which its corresponding leg rests. After each of the clips is nailed or fastened to the opening, the frame is then held in position within the opening. The members may then be slid between the clipped legs, or the legs of the clips may be tapped slightly with a hammer so as to cause them to slide beneath the nail heads, and shift the positions of their respective members. When the frame is properly positioned in the opening, an additional nail can be driven through the opening of the connected leg of the permanent clipped portion. This provides further securing of the permanent clipped portion, which will then remain fixed to the stationery wall member in the adjusted position. The Schnabel patent also discloses the use of finished nails and the use of clipped portions formed with elongated V-notches.

Lovgren, U.S. Pat. No. 4,840,002 issued Jun. 20, 1989 discloses a clip having one arm embedded in the edge of a door jamb, with another arm acting as a backer for the jamb. The leg of the clip is screwed into the edge of the jamb, and into a steel support stud. By screwing into the edge of the jamb and by embedding an arm into that edge, an obstruction is produced which hampers attaching trim around the doorjamb. Lovgren discloses the use of specialized tongue flanges which are designed to fit into customized bores in the wood trim. In accordance with the foregoing, specialized trims must be utilized, and the Lovgren arrangement does not appear to be capable of use with standard door trims.

Funari, U.S. Pat. No. 4,986,044 issued Jan. 22, 1991 discloses a series of jamb assemblies where each consists of a fixed section and an adjustable section. Each fixed section has a series of snap-in guide clips supported on the section. The clips each have a plate-like body, with a leg at each end and an integral cantilever tongue extending generally parallel to, but converging toward, the plate-like body of the clip. In this manner, the tongue is deflected away from the plate-like body. A flange is also provided on the adjustable section, and is received between the cantilever tongue and one of the legs. The tongue of each clip frictionally engages the adjustable section holding it in the adjusted position on the doorjamb.

McKann, et al., U.S. Pat. No. 6,286,274 issued Sep. 11, 2001 describes a coupling for mounting a door frame within an opening. The coupling includes two, substantially identical anchoring clips and two, substantially identical retaining clips. Each anchoring clip includes a base mounting portion and a resilient cantilever portion extending at a non-perpendicular angle from the base mounting portion. The anchoring clips are oriented in opposition to each other. Each retaining clip includes a base mounting section and an angled section extending in a cantilevered manner from its base mounting section. The retaining clips are oriented in a mirror image, so that the cantilever portions of the anchoring clips engage the angled sections of the retaining clips.

Staples, et. al., U.S. Patent Application Publication No. 2004/0060241 published Apr. 1, 2004 describes a single piece, unitary installation aid for holding a door in place relative to a door frame in a pre-hung door assembly, during transportation and installation of the door assembly in a building. The aid includes a wall having an inner surface and an outer surface, and a door clip extending from the wall inner surface. A jamb clip extends from the wall outer surface. The door clip is sized so as to fit over the door, and the jamb clip is sized so as to fit over the jamb. The door clip includes a pair of spaced apart arms extending from the wall inner surface. A finger extends from an end of at least one of the arms, and toward the opposite arm. The jamb clip includes a first leg extending from the wall outer surface, and a second leg extending upwardly from the first leg. The first leg has a length from the wall to the second leg which is slightly greater than the width of the doorjamb.

Loop, U.S. Pat. No. 6,178,717 issued Jan. 30, 2001 discloses a door hanging system utilizing a series of metallic, elongated U-shaped clips which expand the area between the edge of the door opening and the doorjamb. The metallic clips serve to as to support the weight of the door or door jamb during the adjustment phase of installation, and then properly anchor the same once orientation of the door has been achieved.

The foregoing patents and patent applications represent a sample of prior art assemblies directed to facilitating the installation of door assemblies. Each of the foregoing documents disclose installation products and methods distinguishable from the present invention.

SUMMARY OF THE INVENTION

In accordance with the invention, a door hanger is adapted for use in installation of a door assembly. The hanger includes a jamb arm having a substantially triangular shaped edge, with proximate shorter edges formed inwardly from the triangular shaped edge and perpendicular to each other. The jamb arm also has a substantially flattened configuration, with a pair of opposing faces formed by the triangular shaped edge and the proximate edges. A central hole is located substantially in the center of the pair of opposing faces. An alignment flange is formed in a configuration substantially perpendicular to the jamb arm, and has a distal arcuate edge. The arcuate edge has a configuration substantially conforming to the legs of a triangle. The hanger also includes a pair of opposing sides formed inwardly from the distal arcuate edge, and one or more sets of alignment notches are formed on the opposing sides.

In accordance with further aspects of the invention, the door hanger includes an alignment slot formed within the alignment flange. The alignment slot is adapted to provide the capability of selectively aligning connecting means for attaching the door hanger to either a strike side wall or a hinge side wall. A pair of tabs are provided for assisting an installer in proper alignment of the door hanger along the edges of a strike jamb or a hinge jamb.

In accordance with other aspects of the invention, the invention includes a method for facilitating accurate installation of an interior door assembly, utilizing a series of door hangers. The door assembly includes a door and doorjamb. The method includes the step of hingedly connecting the door to the door jamb so as to form a prehung door assembly. The door is maintained in a closed position within the doorjamb. A line is marked on a hinge side wall a predetermined distance from a rough opening within which the installation of the door assembly will occur. The marked line occurs through the use of a plumb bob, laser device or other marking means.

A plurality of the door hangers are installed behind centers of each hinge utilized for door connection. This installation occurs in a manner so that a jamb arm of each of the door hangers is secured to a lateral side of a hinge jamb. A plurality of additional door hangers are secured through their jamb arms to a lateral side of the strike jamb on the other side of the door. The door hangers are configured and secured to the strike jamb and the hinge jamb so that an alignment flange of each door hanger faces the side of the door corresponding to the side into which the door may be opened. The method further includes the step of aligning the alignment notches on the alignment flanges of the door hangers connected to the hinge jamb, with the marked line.

In addition to the foregoing, the method in accordance with other aspects of the invention includes placing the door assembly into the rough opening following installation of the door hangers. When the alignment notches are properly aligned with the marked line, connecting means are inserted through the alignment slots so as to be received within the hinge side wall and into one or more vertical studs.

BRIEF DESCRIPTION OF THE DRAWINGS

The invention will now be described with respect to the drawings, in which:

FIG. 1 is a front elevation view showing a rough opening within a wall structure for a door assembly using door hangers and methods in accordance with the invention for installing the door assembly;

FIG. 2 is an enlarged view of the area identified as rectangle 2 in FIG. 1, showing relative positioning of a plumb line with respect to the wall and the door frame;

FIG. 8 is an enlarged view of the section identified as rectangle 8 in FIG. 7;

DETAILED DESCRIPTION OF THE PREFERRED EMBODIMENT

Figure 3:
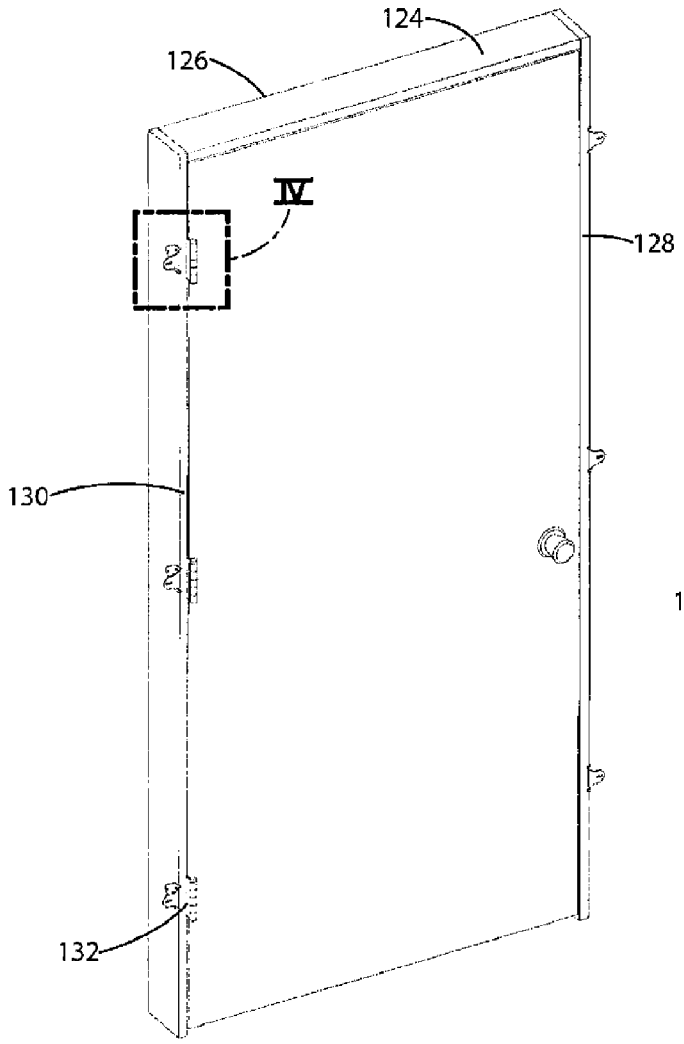
FIG. 3 is a perspective view illustrating a door and door jamb, with door hangers in accordance with the invention attached to the door jamb.
Figure 4:
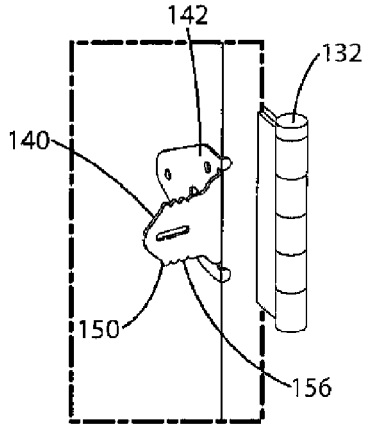
FIG. 4 is an enlarged view of the section shown as rectangle 4 in FIG. 3.
Figure 6:
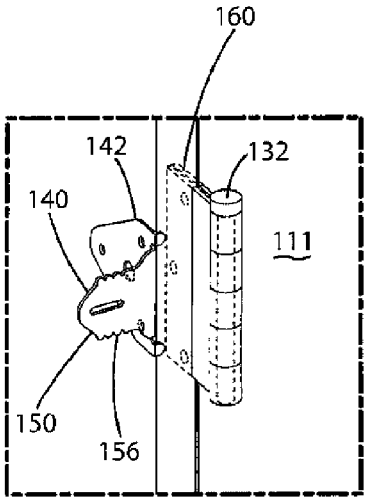
FIG. 6 is an enlarged view of the section identified as rectangle 6 in FIG. 5.

The principles of the invention are disclosed, by way of example, in door hangers 140 and methods for use thereof for installation of a door assembly 100 as illustrated in FIGS. 1-13. In accordance with the invention, the door hangers 140 and the use thereof in installing the door assembly 100 facilitates minimizing the time required to install a door 110 and door jamb 124 within a rough opening 103 formed within a wall 102. The use of the door hangers 140 also facilitates a plumb door having equal reveals the first time the plumbing and hanging process is utilized to install the door assembly 100. Still further, known installation of doors often require the door to be taken off of the jamb during installation. In contrast, with the door hangers 140 in accordance with the invention, and the method for use thereof in accordance with the invention, the user can plumb and hang the door 110 with the door 110 still hung on the door jamb 124. Still further, methods known for plumbing and hanging an interior door often require shims and the driving of numerous nails or the like. Such materials are not required with the use of the door hangers 140 in accordance with the invention.

Figure 7:
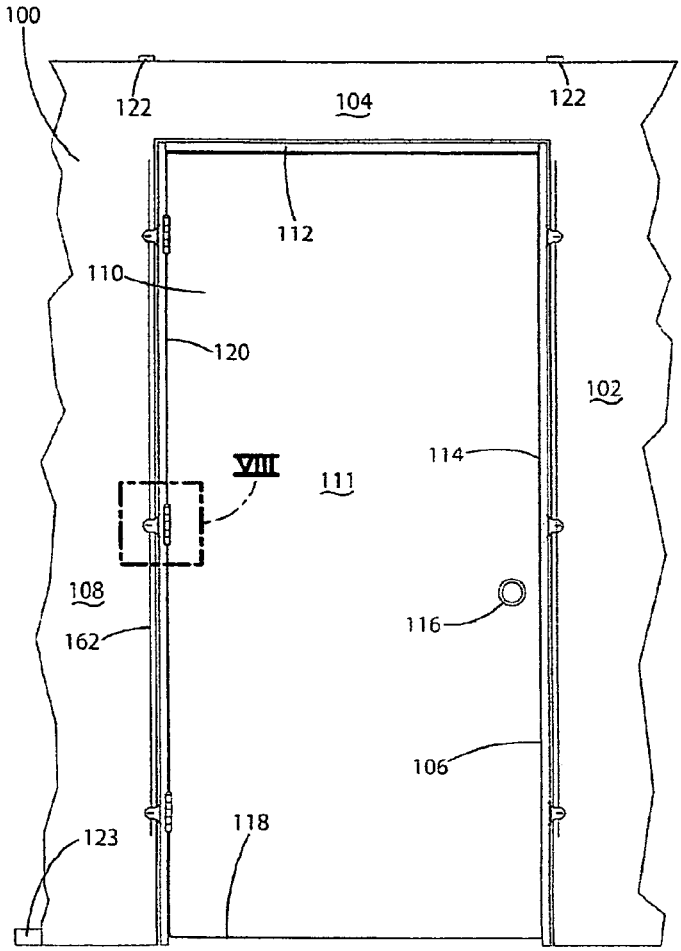
FIG. 7 is a front elevation view of the door, doorjamb and door hangers as assembled within the door frame.
Figure 9:
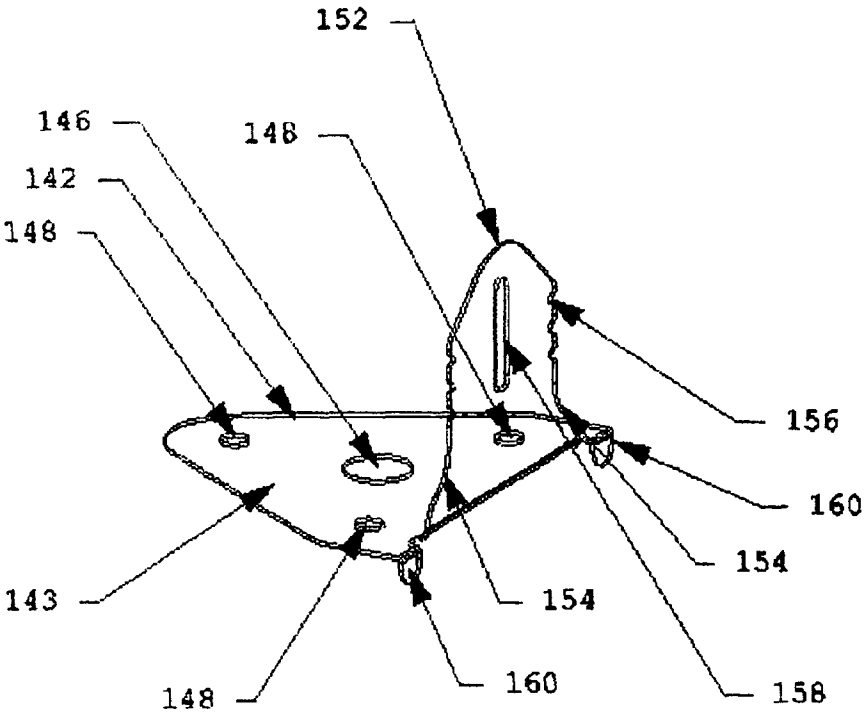
FIG. 9 is a perspective and transparent view of a door hanger in accordance with the invention.
Figure 11:
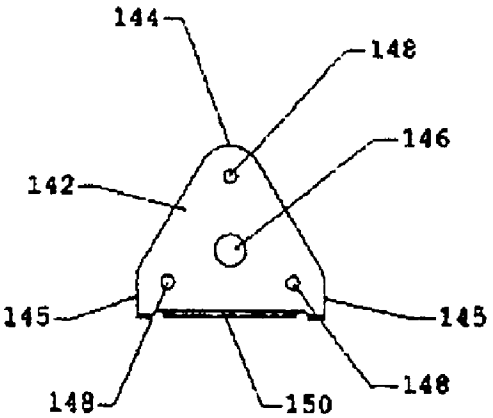
FIG. 11 is an underside view of the door hanger shown in FIG. 10, and rotated 90° relative to the view of FIG. 10.
Figure 13:
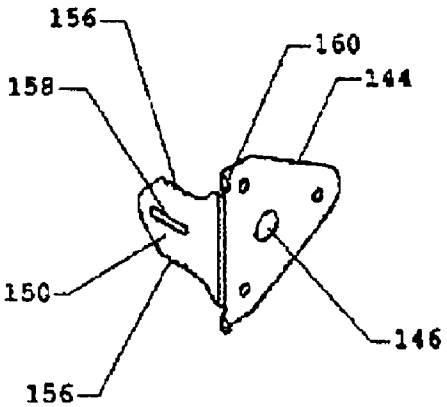
FIG. 13 is a partially perspective view of the door hanger illustrated in FIG. 9, and shown in a solid format.
Figure 12:
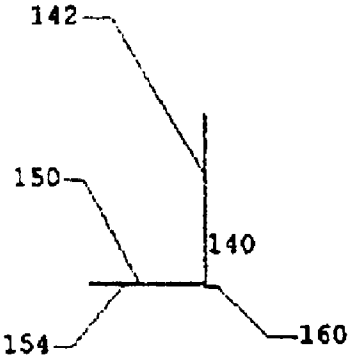
FIG. 12 is a side elevation view of the door hanger illustrated in FIG. 11, and rotated 90° with respect to the view in FIG. 11.
Figure 10:
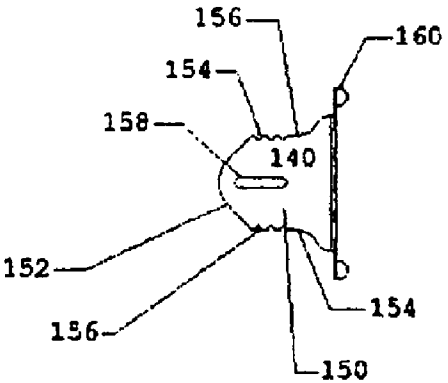
FIG. 10 is a front elevation view of the door hanger illustrated in FIG. 9.

Turning to the drawings, a door assembly 100 (shown in a stand alone configuration in FIG. 3) is to be installed with in a rough opening 103 of a wall 102, as illustrated in FIG. 1. With reference primarily to FIGS. 1 and 7, the wall 102, as formed around the periphery of the rough opening 103, comprises an upper wall 104. Extending downwardly from the upper wall 104 on one side of the rough opening 103 is a latch side wall or "strike" side wall 106. As primarily shown in FIG. 7, the side wall 106 is referred to as the latch side wall or strike side wall in view of its adjacency to the latch or strike side of the door 110. Extending downwardly from the upper wall 104 along the opposing edge of the rough opening 103 is a side wall referred to as a hinge side wall 108. This hinge side wall 108 is shown in FIG. 7 on the left side of the door 110. The wall 108 is referred to as the "hinge" side wall in view of its adjacency to the hinge edge 120 of the door 110.

As shown primarily in FIG. 1, the left opening 103 within the wall 102 is formed in between a pair of vertical studs 122, conventional in nature within a building interior. As an example construction, a floor stud 123 is shown extending laterally from one of the vertical studs 122. Forming the top of the rough opening 123 is a header 125, connected between the opposing pair of studs 122.

Figure 5:
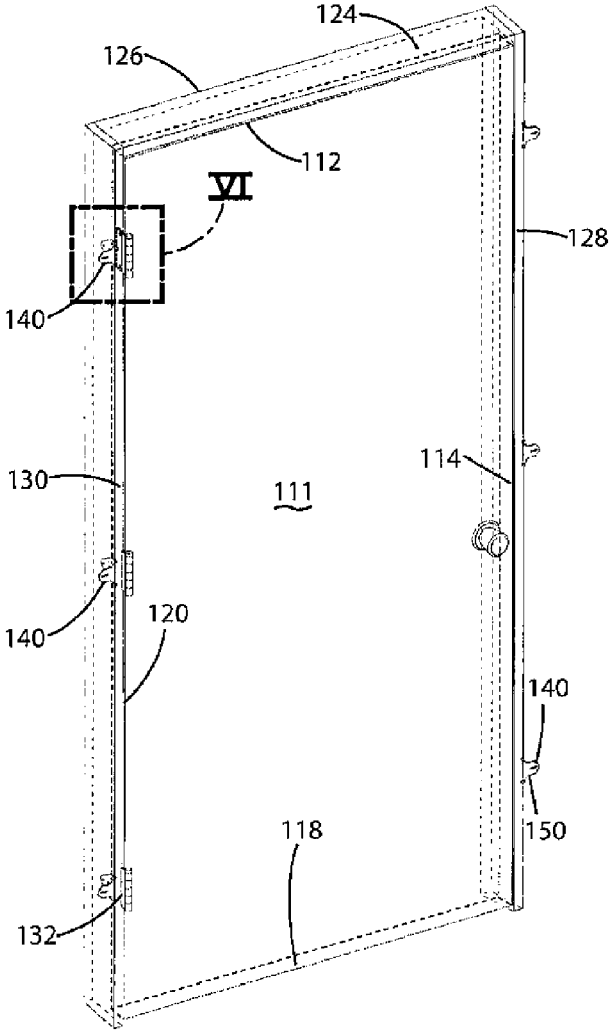
FIG. 5 is a perspective view of the door and door jamb substantially similar to FIG. 3, but showing the components in a transparent view.

The door assembly 100 to be mounted within the rough opening 103 of the wall 102 is primarily shown in FIGS. 3, 5 and 7. With reference thereto, the door assembly 100 includes a conventional door 110 and a conventional door jamb 124. The door 110 is rectangular in configuration and includes an upper edge 112. In the view of the door 110 illustrated in FIG. 7, the door 110 includes a right side edge 114, referred to herein as the latch or strike edge 114. A door knob 116 extends outwardly from the face 111 of the door 110, adjacent to the latch or strike edge 114. Although not shown in the drawings, the knob 116 can be connected to a conventional latch assembly for purposes of releasably closing the door 110. The door 110 further includes a lower edge 118 running along the bottom of the door 110. With reference still to FIG. 7, the door 110 also includes a left side edge or hinge edge 120. The edge 120 is referred to as the "hinge" edge in view of the hinges 132 which are connected to the door 110 along the hinge edge 120.

The door assembly 100, in addition to the door 110, also includes a door jamb 124. Again as shown primarily in FIGS. 3, 5 and 7, the door jamb 124 includes an upper header jamb 126 extending across the top of the door 110 adjacent the upper edge 112 of the door 110. As viewed in FIG. 7, adjacent the strike edge 114 of the door 110 (when the door 110 is closed) is a vertically disposed strike jamb 128. The strike jamb 128 extends from the top of the door jamb 124 to the bottom adjacent the lower edge 118 of the door 110. As further viewed in FIG. 7, on the left side of the door 110 and adjacent the hinge edge 120 of the door 110 is a vertically disposed hinge jamb 130. The hinge jamb 130 is essentially a mirror image of the strike jamb 128 and extends from the top of the door 110 (adjacent the header jamb 126) to the bottom of the door 110 adjacent the lower edge 118. Although not shown in the particular embodiment of the door jamb 124 illustrated herein, the door jamb 124 could also include a sill or like component extending between the lower ends of the strike jamb 128 and hinge jamb 130.

The door assembly 100 is typically referred to as a "prehung" assembly, in that the door 110 is already hingedly mounted on the door jamb 124, before the door jamb 124 is set into the opening 103 within the wall 102. This mounting occurs through the use of conventional hinges 132, primarily shown in FIGS. 3-6 and 8.

In accordance with the invention, the installation of the door assembly 100 is achieved through the use of a set of door hangers. One exemplary embodiment of door hangers which may be utilized in accordance with the invention is illustrated primarily in FIGS. 9-13, with a single one of the door hangers identified as door hanger 140. With reference to these drawings, each door hanger 140 can be characterized as having a configuration substantially corresponding to two triangular and integral elements which are formed so as to be perpendicular to each other. One of these elements is illustrated in the drawings as a jamb arm 142, primarily shown in FIGS. 9 and 11. With reference thereto, the jamb arm 142 has a substantially triangular shaped edge 144, with proximate shorter edges 145 formed inwardly from the triangular shaped edge 144 and perpendicular to each other. The jamb arm 142 has a substantially flattened configuration, with a pair of opposing faces 143 formed by the triangular shaped edge 144 and the proximate edges 145. Located substantially in the center of the faces 143 is a central hole 146. Surrounding the central hole 146 are a series of screw apertures 148. In the particular embodiment of door hanger 140 in accordance with the invention, the jamb arm 142 includes three screw apertures 148.

Formed in a configuration substantially perpendicular to the jamb arm 142 is another somewhat triangular element, referred to herein as an alignment flange 150. The alignment flange 150 is primarily shown in FIGS. 9 and 10. With reference thereto, the alignment flange 150 is perpendicular to the jamb arm 142 and includes a distal arcuate edge 152. The arcuate edge 152 has a configuration substantially conforming to the legs of a triangle. Formed inwardly from the distal arcuate edge 152 are a pair of opposing sides 154. Formed on the opposing sides 154, which are substantially parallel to each other, are sets of alignment notches 156. In the particular embodiment of the door hanger 140 in accordance with the invention as described herein, three alignment notches 156 are formed on each of the sides 154. As described in greater detail herein, the alignment notches 156 are advantageously utilized with a plumb line for purposes of accurate alignment of the door assembly 100.

In addition to the alignment notches 156, the alignment flange 150 also includes an alignment slot 158. The alignment slot 158, as further described herein, provides the capability of selectively aligning a connecting screw or the like for attaching the door hanger 140 to either the strike side wall 106 or the hinge side wall 108. Still further, the door hanger 140 also includes a pair of tabs 160, as primarily shown in FIGS. 9, 10 and 12. The tabs 160 assist in proper alignment of the door hanger 140 along the edges of the strike jamb 128 or hinge jamb 130, as the case may be.

It should be emphasized that the door hanger 140 described herein in accordance with the invention is one of numerous configurations of door hangers which may be utilized without departing from the spirit and scope of certain of the novel concepts of the invention. That is, the inventive concepts described herein are embodied not only within the particular door hanger 140, but also within door hangers having configurations which are not identical to those of the door hangers 140. Also, as earlier described, and as will be apparent from subsequent description herein, certain principles of the invention reside in methods associated with the installation of door assemblies, utilizing door hangers in accordance with the invention.

An example embodiment of an installation process in accordance with the invention, using the door hangers 140, will now be described with respect to the drawings. As earlier described, the door assembly 100 comprises the door 110 and the door jamb 124. Installation of the door assembly 100 within the opening 103 of the wall 102 can be undertaken with the door 110 first hingedly connected to the doorjamb 124. This configuration is typically referred to as a "pre-hung" door assembly. Further, the door 110 can be "closed" within the door jamb 124 during installation. In this regard, to the extent that the door assembly 100 includes a latch stop (not shown in the drawings), the latch stop does not need to be removed from the door assembly 100, until the assembly 100 is fully installed.

To initiate installation, a plumb line can first be drawn approximately 0.5 inches from the rough opening 103 on the hinge side wall 108. Such a plumb line is illustrated, for example, in FIGS. 2 and 8, and is referred to herein as plumb line 162. Of course, rather than drawing a plumb line 162, a requisite plumb line can be provided through the use of a plumb bob, laser device or various other commercially available products.

Turning to the door hangers 140 and the door assembly 100, the installer may then install one each of the door hangers 140 essentially behind the center of each hinge 132. The installation position is particularly shown in FIGS. 4 and 8. More specifically, the jamb arm 142 is secured to the lateral side of the hinge jamb 130. Correspondingly, on the other side of the door 110, three of the door hangers 140 may be secured (through their jamb arms 142) to the lateral side of the strike jamb 128. As an example, the jamb arm 142 can be secured to the strike jamb 128 or hinge jamb 130 through the use of 0.5 inch screws or similar connecting devices which can be received through the screw apertures 148 and screwed into the appropriate jamb. In this regard, and with reference again to FIGS. 9 and 11, the central hole 146 is provided for purposes of compensating for a jamb screw which may stick through the jamb to which the door hanger 140 is being secured. As apparent from the drawings, each of the door hangers 140 is secured to the appropriate jamb so that the alignment flange 150 associated therewith faces the side of the door 110 corresponding to the side into which the door may be opened. In the example embodiment of the door 110 as illustrated in the drawings, three door hangers 140 are utilized on each side of the doorjamb 124. The three door hangers 140 on the hinge jamb are located essentially behind the hinges 132. The door hangers 140 which are located and secured to the strike jamb 128 are preferably positioned directly across from the locations of the hinges 132. This configuration of the door assembly 100 and the door hangers 140 is essentially shown in FIGS. 5 and 6.

Following installation of the door hangers 140 on the door assembly 100, the door assembly 100 can then be placed into the rough opening 103. With the door assembly 100 positioned within the opening 103, the alignment notches 156 on the alignment flanges 150 of the door hangers 140 connected to the hinge jamb 130 can then be aligned with the plumb line 162. When the installer considers the alignment notches 156 to be properly aligned with the plumb line 162, the connecting screws (such as, for example, 1.625 inch screws) can be received through the alignment slots 158 and received within the hinge side wall 108 and into one of the vertical studs 122.

After completing the connection of the alignment flanges 150 to the appropriate vertical stud 122, the installer should preferably check the reveals on the latch or strike side of the door 110, as well as above the upper edge 112 of the door 110. The reveal extending along the upper edge of the door 110 should maintain a consistent width. Correspondingly, the reveal extending from the upper edge 112 of the door 110 to the lower edge 118 along the hinge edge 120 of the door 110 should also maintain a consistent width. After this is checked, the installer can connect the alignment flanges 150 to the vertical stud 122 located adjacent the hinge side wall 108. The door assembly 100 is thus installed within the opening 103 of the wall 102.

As earlier stated, the door hangers 140 in accordance with the invention and the method described herein for installing the door assembly 100 in accordance with the invention is relatively quick and takes substantially less time than known installation procedures. The method for installation, with three hinges 132, requires only six of the door hangers 140. The method in accordance with the invention also ensures a plumb door, with equal reveals being achieved upon the first attempt for installation. Still further, although a typical installation of a door requires the door to be taken off during installation, the method set forth herein in accordance with the invention provide for installation occurring with a prehung door assembly, and with the door 110 closed within the doorjamb 124. Still further, the door hangers 140 and the method for installation associated therewith eliminates the need for items such as shims, nail guns or the like. Still further, the central hole 146 on the jamb arm 142 of each door hanger 140 allows the installer to position the door hanger 140 directly behind the jamb where all the pressure is located. This is advantageous, in that it is extremely important for the pressure points of a door to be secure, and having the door hangers 140 installed behind the hinges 132 facilitates a secure installation.

Still further, the alignment flanges 150 and tabs 160 are of substantial assistance to the installer in helping to align the hangers 140 relative to the doorjamb 124 relatively rapidly, and without any complex procedures. The alignment flanges 150 and tabs 160 allow the installer to install the door hangers 140 in a relatively accurate manner, plumb with the door 110. This structure and process eliminates the need to "feel" a hanger, so as to make sure that it is plumb with a doorjamb. Still further, with the plumb line 162 drawn on the wall 102, and with the use of the alignment notches 156, the need is eliminated to constantly "pick up" a level, so as to make sure that a door is properly plumbed. Still further, not only do the door hangers 140 and the method described herein for installation of the door assembly 100 in accordance with the invention permit the installer to maintain the door 110 on the doorjamb 124, but also permits the installer to keep the strike plate holders (not shown in the drawings) in an installed configuration. Still further, the flexibility of the door hangers 140 with respect to the use thereof also enable the installer to compensate for inconsistencies caused by framing or the like (i.e. bottom plates not lining up, bowed studs, twisted studs, etc.).

It will be apparent to those skilled in the pertinent arts that other embodiments of door hangers and methods for use thereof in accordance with the invention can be achieved. That is, the principles of door hangers and methods for use thereof in accordance with the invention are not limited to the specific embodiments described herein. It will be apparent to those skilled in the art that modifications and other variations of the above-described illustrative embodiments of the invention may be effected without departing from the spirit and scope of the novel concepts of the invention.

What is claimed is:

[1. A door hanger adapted for use in installation of a door assembly, said door hanger comprising:

a jamb arm having a substantially triangular shaped edge, with proximate shorter edges formed inwardly from said triangular shaped edge and parallel to each other;

said jamb arm further has a substantially flattened configuration, with a pair of opposing faces formed by said triangular shaped edge and said proximate edges;

a central hole located substantially in the center of said pair of opposing faces;

an alignment flange formed in a configuration substantially perpendicular to said jamb arm, and having a distal arcuate edge;

said arcuate edge having a configuration substantially conforming to the legs of a triangle;

a pair of opposing sides formed inwardly from said distal arcuate edge; and one or more sets of alignment notches formed on said opposing sides.]

2. A door hanger in accordance with claim [1] *5*, characterized in that said door hanger further comprises:

an [alignment slot formed within] *opening in* said alignment flange[, and adapted to provide the capability of selectively aligning connecting means] for *receiving a fastener for* attaching said door hanger to [either a strike side wall or a hinge side wall; and a pair of tabs for assisting an installer in proper alignment of said door hanger along the edges of a strike jamb or a hinge jamb.] *a wall adjacent a door jamb.*

*3. A door hanger in accordance with claim 2, in which said alignment flange further comprises a pair of said edges extending from said jamb arm and spaced from one another to define the top and bottom edges of said alignment flange; and in which said door hanger includes a pair of said tabs, spaced from one another, one being located adjacent to said top edge of said alignment flange, and the other being located adjacent to said bottom edge of said alignment flange.*

*4. A door hanger in accordance with claim 3, characterized in that said alignment flange further comprises:*

*at least two of said notches, at least one of said notches in said top edge and one in said bottom edge.*

*5. A door hanger adapted for use in installation of a residential, commercial and office interior type door assembly including a door jamb with hinges mounted thereto, said door hanger comprising:*

*a one piece bracket consisting essentially of:*

*a jamb arm for securing to a door jamb; an alignment flange formed in a configuration generally perpendicular to said jamb arm, and having an edge extending from said jamb arm to a point distal therefrom;*

*at least one alignment notch formed in said alignment flange edge;*

*at least one tab extending in the plane of said alignment flange beyond the plane of said jamb arm for assisting an installer in proper alignment of said door hanger along the edges of a jamb.*

*6. A door hanger in accordance with claim 5, in which said alignment flange further comprises a pair of said edges extending from said jamb arm and spaced from one another to define the top and bottom edges of said alignment flange; and in which said door hanger includes a pair of said tabs, spaced from one another, one being located adjacent to said top edge of said alignment flange, and the other being located adjacent to said bottom edge of said alignment flange.*

*7. A door hanger in accordance with claim 6, characterized in that said alignment flange further comprises:*

*at least two of said notches, at least one of said notches in said top edge and one in said bottom edge.*

*8. A door hanger adapted for use in installation of a residential, commercial and office interior type door assembly including a door jamb with hinges mounted thereto, said door hanger comprising:*

*a one piece bracket consisting essentially of:*

*a jamb arm for securing to a door jamb; a alignment flange formed in a configuration generally perpendicular to said jamb arm;*

*a pair of said edges extending from said jamb arm and spaced from one another to define the top and bottom edges of said alignment flange;*

*a set of at least two spaced notches in said top edge of said alignment flange, and a set of at least two of said notches in said bottom edge of said alignment flange; and*

*at least one tab extending in the plane of said alignment flange beyond the plane of said jamb arm for assisting an installer in proper alignment of said door hanger along the edges of a jamb.*

*9. A door hanger in accordance with claim 8, characterized in that said jamb arm has a substantially triangular shaped edge, with proximate shorter edges formed inwardly from said triangular shaped edge and parallel to each other.*

*10. A door hanger in accordance with claim 9, characterized in that said jamb arm has a substantially flattened configuration, with a pair of opposing faces formed by said triangular shaped edge and said proximate edges.*

*11. A door hanger in accordance with claim 9, characterized in that said jamb arm further comprises:*

*a central hole located substantially in the center of said jamb arm.*

*12. A door hanger in accordance with claim 5, characterized in that:*

*said alignment flange has a distal arcuate edge, said arcuate edge having a configuration substantially conforming to the legs of a triangle.*

*13. A door hanger in accordance with claim 12, characterized in that said alignment flange further comprises:*

*a pair of opposing sides formed inwardly from said distal arcuate edge; and one or more sets of alignment notches formed in said opposing sides.*

*14. A door frame for a residential, commercial and office interior type door, and door hanger for hanging said door frame; said door frame including a door jamb with hinges mounted thereto, and said door hanger comprising a one piece bracket of size comparable to the size of one of said door hinges, consisting essentially of:*

*a jamb arm for securing to said door jamb;*

*an alignment flange formed in a configuration generally perpendicular to said jamb arm, and having an edge extending from said jamb arm to a point distal therefrom;*

*and at least one "V" shaped alignment notch formed in said alignment flange edge, between said jamb arm and said distal point, such that said each leg of said "V" extends from said alignment flange edge inwardly into said alignment flange and meet at a point in said alignment flange which is spaced from said edge.*

*15. A door frame and door hanger combination in accordance with claim 14, characterized in that said door hanger further comprises:*

*an opening in said alignment flange for receiving a fastener for attaching said door hanger to a wall adjacent said door jamb.*

*16. A door frame and door hanger combination in accordance with claim 15, in which there is at least one tab extending in the plane of said alignment flange beyond the plane of said jamb arm for assisting an installer in proper alignment of said door hanger along the edges of said jamb.*

*17. A door frame for a residential, commercial and office interior type door, and door hanger for hanging said door frame; said door frame including a door jamb with hinges mounted thereto, and said door hanger comprising a one piece bracket of size comparable to the size of one of said door hinges, consisting essentially of:*

*a jamb arm for securing to said door jamb;*

*an alignment flange formed in a configuration generally perpendicular to said jamb arm, and having an edge extending from said jamb arm to a point distal therefrom;*

*and at least one alignment notch formed in said alignment flange edge; and*

*at least one tab extending in the plane of said alignment flange beyond the plane of said jamb arm for assisting an installer in proper alignment of said door hanger along the edges of said jamb.*

*18. A door frame and door hanger combination in accordance with claim 17, in which said alignment flange further comprises: a pair of said edges extending from said jamb arm and spaced from one another to define the top and bottom edges of said alignment flange; and in which said door hanger includes a pair of said tabs, spaced from one another, one being located adjacent to said top edge of said alignment flange, and the other being located adjacent to said bottom edge of said alignment flange.*

*19. A door frame and door hanger combination in accordance with claim 18, characterized in that said door hanger alignment flange further comprises:*

*at least two of said notches, at least one of said notches in said top edge and one in said bottom edge.*

*20. A door frame and door hanger combination in accordance with claim 14, characterized in that said door hanger alignment flange further comprises:*

*a pair of said edges extending from said jamb arm and spaced from one another to define the top and bottom edges of said alignment flange; and*

*at least two of said notches, at least one of said notches in said top edge and one in said bottom edge.*

*21. A door frame and door hanger combination in accordance with claim 17, characterized in that said door hanger jamb arm has a substantially triangular shaped edge, with proximate shorter edges formed inwardly from said triangular shaped edge and parallel to each other.*

*22. A door frame and door hanger combination in accordance with claim 17, characterized in that:*

*said door hanger alignment flange has a distal arcuate edge, said arcuate edge having a configuration substantially conforming to the legs of a triangle.*

* * * * *